United States Patent [19]
Montag et al.

[11] Patent Number: 5,480,305
[45] Date of Patent: * Jan. 2, 1996

[54] WEATHER SIMULATION SYSTEM

[75] Inventors: Bruce C. Montag; Dennis J. Wenzel; Richard P. Weyrauch, all of San Antonio, Tex.

[73] Assignee: Southwest Research Institute, San Antonio, Tex.

[*] Notice: The portion of the term of this patent subsequent to Apr. 25, 2012, has been disclaimed.

[21] Appl. No.: 326,601

[22] Filed: Oct. 20, 1994

Related U.S. Application Data

[63] Continuation of Ser. No. 145,761, Oct. 29, 1993.

[51] Int. Cl.⁶ .................................................. G01S 13/00
[52] U.S. Cl. ............................................. 434/2; 342/26
[58] Field of Search .................................. 342/26; 434/2

[56] References Cited

U.S. PATENT DOCUMENTS

| | | | |
|---|---|---|---|
| 3,826,864 | 7/1974 | Paufve | 178/6.8 |
| 4,016,658 | 4/1977 | Porter et al. | 35/12 N |
| 4,199,875 | 4/1980 | Barbarasch | 35/12 N |
| 4,313,726 | 2/1982 | Chase | 434/42 |
| 4,493,647 | 1/1985 | Cowdrey | 434/2 |
| 4,667,199 | 5/1987 | Roberts | 342/169 |
| 5,135,397 | 8/1992 | Yen | 434/2 |
| 5,379,215 | 1/1995 | Kruhoeffer et al. | 364/420 |

*Primary Examiner*—Mark Hellner
*Attorney, Agent, or Firm*—Baker & Botts

[57] ABSTRACT

A weather simulation system that generates and distributes weather data to simulation subsystems for the real time simulation of weather conditions, from three-dimensional real world data. A real world database is accessed to obtain a dataspace of weather data elements, each having a set of various weather-related parameters. For "out-the-window" weather displays, these data elements are preprocessed to obtain color and transparency values for each data element. The preprocessed data elements are further processed to obtain a prioritized display list of those data elements that are in a field of view. Each data element in this list is assigned a graphics primitive, whose alignment is determined by a wind vector of that data element. Pixel values are assigned to the graphics primitives, using color and transparency values of the associated data elements.

29 Claims, 3 Drawing Sheets

WEATHER SIMULATION SYSTEM

CROSS REFERENCE TO RELATED APPLICATIONS

This application is a continuation application of U.S. application Ser. No. 08/145,761, filed Oct. 29, 1993 and entitled "Weather Simulation System", pending.

TECHNICAL FIELD OF THE INVENTION

This invention relates to weather simulation, and more particularly to a weather simulation system that generates weather data from three-dimensional real world data, and coordinates the weather data to simulation subsystems.

BACKGROUND OF THE INVENTION

Weather simulation is often associated with aircraft flight training. Such systems typically provide "out-the-window" displays of the terrain that would be seen during actual flight. In addition to terrain, an enhancement to flight simulation display systems is the simulation of weather conditions, either by simulating the output of weather-sensing instrumentation or by illustrating weather conditions as part of the out-the-window display.

Some existing weather simulation systems provide radar video. U.S. Pat. Nos. 5,135,397, 4,667,199, and 4,493,647 are examples of radar output simulators. Other weather simulation systems provide a visual image of the weather. U.S. Pat. Nos. 4,199,875, 4,016,658, and 3,826,864 are examples of visual effects simulators.

A problem with existing weather simulation methods is that they do not provide meteorological realism. Cloud formations are not based on real-world weather data, but are modeled by manual composition or digitized from two-dimensional illustrations. Another problem with existing weather simulators is that various simulation subsystems, such as displays of radar, through-the-window, or vehicle motion, are not coordinated with the weather simulation.

SUMMARY OF THE INVENTION

One aspect of the invention is a method of using a computer to generate a visual display of weather conditions, using three-dimensional digital source data that represent real-world weather conditions. The computer accesses a real world database to obtain a three-dimensional set of data elements, each data element having at least a location value, a wind vector value, and a liquid water content value. During a preprocessing phase, it receives sun angle data from which the angle of the sun with respect to the earth's surface can be calculated, and calculates a color value and a transparency value for each data element, using the liquid water content value and the sun angle data.

During a data handling phase, the simulator culls the data elements to determine which are within a field of view. It sorts those data elements that are in the field of view to form a list of data elements in front to back order. It assigns a graphics primitive to each data element. It covers the image plane with the graphic primitives associated with the frontmost of the data elements, such that a certain percentage of the image plane is covered. It repeats this covering step, using data elements in front to back order, until the image plane has been covered a predetermined number of times or until all of the data elements have been used. It associates each set of data elements that cover the image plane once with a depth bin.

During an image generation phase, the computer rasterizes the graphics primitives by first assigning pixel values to the primitives in the deepest of said depth bins, using the color and transparency values assigned to the associated data elements. It repeats this rasterizing step to obtain pixel values for the graphics primitive in each of the depth bins, in back to front order, such that for each pixel, the color and transparency values of an underlying pixel are used to derive a current pixel value. It displays current pixel values on a display screen.

For "out-the-window" applications, visual images of weather conditions are generated in four dimensions (space plus time), to provide a real-time image of what a user would see while moving through the weather. The user is provided with scenes of visual weather indicators, such as heavy clouds and rain. This teaches the user how to interpret visual features. Adding weather realism to simulators will improve safety training and enhance system development. The weather simulation system can be easily integrated with other simulation systems, such as flight training systems.

Other applications of the system are for simulating physical systems, such as sensors, instruments, or machinery, whose operation is affected by the weather conditions. For example, the weather simulator might be used for a radar simulation with dynamic weather conditions for the generation of operator displays. The method of the invention enables the radar simulator to be coordinated and synchronized to the atmospheric environment, and enables multiple simulators to interoperate using the same environmental database.

The source data is processed on an "as needed" basis, so that only the airspace within the system's field of view is considered. Various preprocessing and data handling tasks minimize the amount of data to be processed so that real time displays can be generated without significant impact to the system's timing or sizing characteristics.

DETAILED DESCRIPTION OF THE INVENTION

Figure 1:
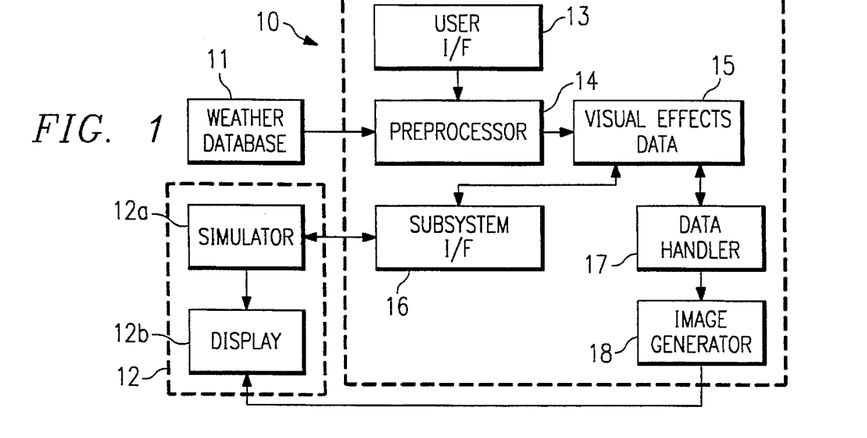
FIG. 1 is a functional block diagram of the processing and data storage components of the invention.

FIG. 1 is a block diagram of the processing and data storage components of a weather simulator 10 in accordance with the invention. Simulator 10 uses source data from a digital weather database 11 to generate displays that illustrate weather conditions. The components of system 10 reside in the memory of a computer system, and when executed, implement the method of the invention.

For purposes of this description, simulator 10 is used to provide an "out-the-window" display of weather conditions for an aircraft flight training subsystem 12, which is comprised of a flight simulator 12a and a display 12b. However, simulator 10 could be used with various other types of subsystems 12. For example, the subsystem 12 may be a flight training system 12 that provides a display of a radar or infrared output screen or other flight instrumentation in operation. Thus, the display could be "out-the-window" of the object being simulated, or from the point of view of an observer. Or the subsystem 12 could have a simulator 12a for some type of vehicle or outdoor equipment other than an aircraft, whose operation is affected by the weather.

Typically, simulator 10 generates a series of images on a display screen in real-time. An advantage of the invention is that the method described herein permits such real-time rendering of weather conditions. The embodiment of this description assumes a real time display of 30 frames per second. However, in other embodiments, single images or slower than real-time displays could be useful.

For flight simulation applications, a computer-based flight training system 12 provides the user with an out-the-window display of land and sky. In this case, simulator 10 could use the same computer system as used to execute subsystem 12, but with additional programming to implement the method described herein.

Flight training system 12 provides viewpoint data, so that the weather display can be located with respect to the viewpoint of a user. For applications other than flight training, other means for providing field of view data could be used, and for this reason, flight training system 12 could be generally described as a "field of view generator". For example, where subsystem 12 is a radar display, the field of view is defined by parameters such as antenna beam width, pulse repetition frequency, azimuth scan limits, and radar range scale. Also, as explained below, subsystem 12 may receive weather data from system 10 for use in simulating the effects of the weather on the motion of a simulated vehicle or machine, such as an aircraft.

Figures 2, 3, 4:
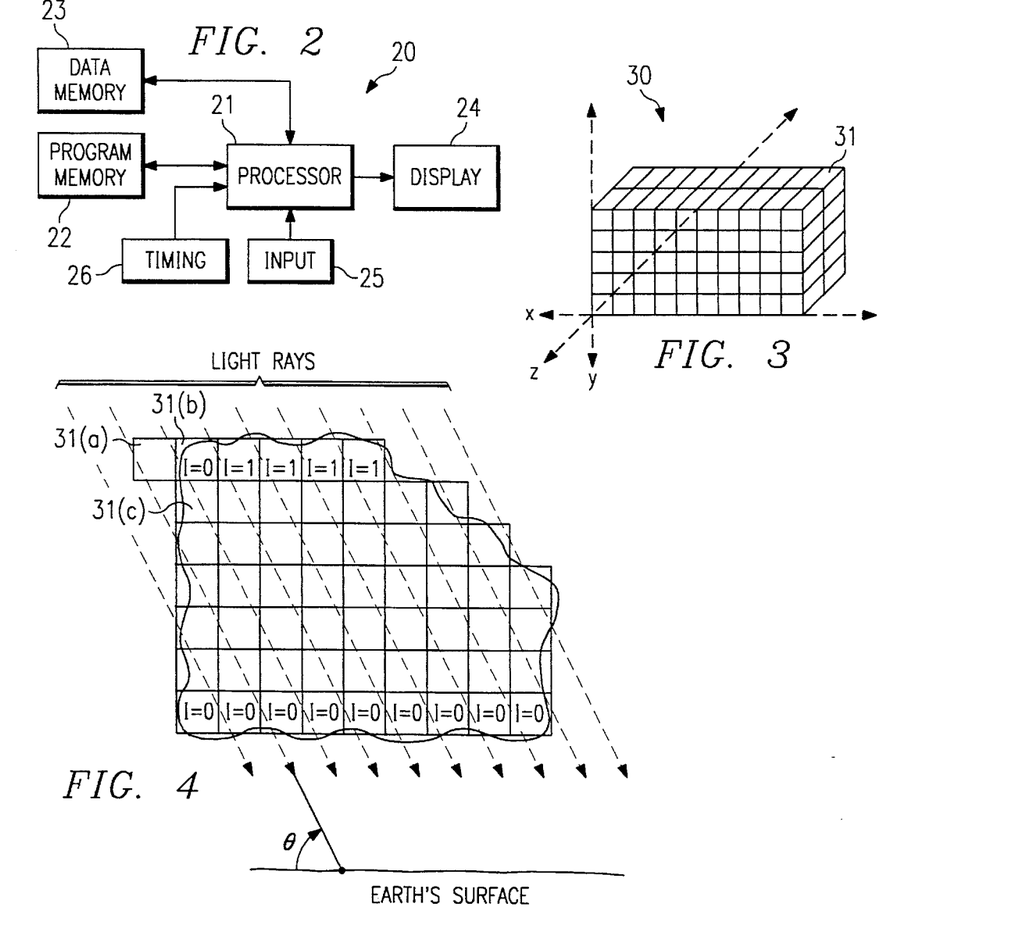
FIG. 2 is a block diagram of a computer system for executing the method of the invention.
FIG. 3 illustrates a portion of a geographic area whose weather data is stored in database 11.
FIG. 4 illustrates a portion of the dataspace of FIG. 3, with light from the sun, whose data elements represent a cloud formation.

FIG. 2 is a block diagram of a computer system 20 for executing the method of the invention. In general, the components of system 20 are conventional computer components, and include a processor 21 for executing instructions for the preprocessor, data handler, and image generator components of FIG. 1. Although FIG. 2 is a system having a single processor for performing the functions of each processing component, the system could be physically as well as functionally divided into separate processing components. A program memory 22 stores program code. A data memory 23 stores data, and includes a mass memory for storing weather database 15. The system also has a graphics display 24 and an input device, such as a keyboard 25. A timing unit 26 provides timing signals for real-time displays. The present invention relates to the use of a computer system, such as that of FIG. 2, which stores and executes programming for the simulation system of FIG. 1.

Referring again to FIG. 1, weather database 11 stores data representing real-world weather conditions. This data is "real world" data in the sense that it represents changing environmental conditions as they might actually occur.

More specifically, database 11 is a three-dimensional collection of data elements, each data element representing a volume of airspace. Each data element has a set of weather parameters, which includes at least the following scalar and vector values:

| | |
|---|---|
| wind speed (x,y,z) | (kts) |
| location (x,y,z) | (ft) |
| radar reflectivity | (DBz) |
| pressure | (mB) |
| temperature | (K) |

As explained below, these parameters determine how cloud formations are displayed. The invention could be implemented with a minimum of three of these parameters: wind speed, location, and radar reflectivity. Wind speed is a vector value, having both magnitude and direction.

Radar reflectivity is used to derive liquid water content, and it is possible that database 11 could already store liquid water content values. For this reason, radar reflectivity values and liquid water content values are both referred to herein as "liquid water content" values.

Database 11 can be collected by known means of acquiring weather-related data. For example, radar reflectivity values can be generated from weather radar output. Satellite-based earth observing weather systems are a source of remotely sensed atmospheric data. Furthermore, either measured parameters or artificially derived parameters, or some combination, may be used.

FIG. 3 illustrates a portion of a dataspace 30, which is comprised of weather data for a geographic area. Dataspace 30 is a three-dimensional array of volume data elements 31, and is oriented with respect to earth-referenced coordinates, x,y,z. Although not explicitly shown in FIG. 3, the position and wind coordinates of each data element 31 are at a specific x,y,z point in that data element 31, such as at its centerpoint. Spacing of data elements 31 is typically uniform, but need not be.

A typical dataspace 30 might represent a real-world area of 800×800 nautical miles. This area might be divided into 2048 data elements 31 in the x and y directions, and 15 layers in the z direction.

In simple applications, dataspace 30 need not have a known real-world location. In this case, it is only necessary that the order and spacing of the data elements 31 be known so that they can be located in the viewer's coordinate system. In more sophisticated applications, a real-world location of dataspace 30 could be mapped to the viewer's real-world location.

As an overview of the invention, preprocessor 14 uses the source data from database 11 and user input from interface 13 to generate a visual effects database 15 of processed data elements 31. Each data element 31 has a set of parameters that describe weather-related visual conditions at that element 31. A simulation interface 16 obtains viewpoint data from flight training system 12 and provides it to data handler 17. Data handler 17 selects data elements 31 that are in the field of view and generates a formatted and prioritized display list. Image generator 18 generates an image from the display list.

User Interface

User interface 13 receives various types of input from a user to control the display. Two types of data that are significant to the invention may be user-supplied. One type of such data is threshold data, which permits the user to specify a threshold for one or more parameters of database 11. For example, the user may specify that only liquid water content values over a certain threshold value are significant. Another type of input data is time-of-day and day-of-year data, which are used to determine the visual effect of sunlight. The processing of both types of data is explained below in connection with preprocessor 14.

Preprocessor

Preprocessor 14 consists of programming for creating a visual effects database 15 from the data in database 11. More specifically, preprocessor 14 performs the tasks of subsampling, thresholding, liquid water content calculation, lighting calculation, coordinate transformation, and dithering.

Subsampling is an optional step, which reduces the amount of data within database 11 to be processed. For example, every n data elements 31 in each direction might be transformed into a larger data element that represents the same area. For convenience of description herein, subsampled data elements are also referred to as data elements 31. To preserve as much information as possible, various interpolation or averaging techniques may be used to obtain new parameters from those of the subsampled data elements 31. Thresholding is another optional step for reducing the amount of data to be processed. A threshold value is specified for one or more parameters in database 11. For example, radar reflectivity is indicative of cloud formation, and any data element 31 whose value is below a given threshold is assumed to be clear sky and not further processed. The default value for thresholding is zero.

For each data element 31, preprocessor 14 calculates its liquid water content, R, from its reflectivity value. An example of such as calculation is:

$$R = \frac{10^{refl/16/0}}{27.4248}$$

where refl is the reflectivity value for the data element 31.

FIG. 4 illustrates a portion of dataspace 30, in two-dimensions. Each data element 31 is either in a cloud or not, as determined by the value of its liquid water content. Thus, for example, where data element 31(a) has a liquid water content value of zero, it is assumed to be clear sky and is not processed. Data element 31(b) has a liquid water content value greater than zero, but this value does not exceed the threshold. Thus, data element 31(b) is treated as clear sky and not processed. Data element 31(c) has a liquid water content that is above the threshold. The boundaries of that data element 31(c) and of all other data elements 31 whose liquid water content values exceed the threshold, define the boundaries of the cloud to be visually displayed. These are the data elements 31 that are further processed after thresholding.

For coordinate transformation, the position coordinates of the data elements 31, as well as their wind vector coordinates, are transformed into whatever coordinates are used for the viewer's field of view. For example, to make the data consistent with flight training systems, transformation is to north-east-down (N-E-D) coordinates. In the N-E-D system, sea level is at a down of zero and altitude is in negative units. North corresponds to a heading of zero degrees and east corresponds to a heading of ninety degrees. As a result of transformation, dataspace 30 is placed in the vicinity of the viewer and is correctly oriented with respect to the user.

For lighting calculations, all light is assumed to be from the sun, whose radiation is modeled as parallel rays. Sun-angle data (time-of-day and day-of-year) determine the angle of the sun with a plane representing the earth's surface. This sun-angle data may be provided by a user via interface 13, or may be automatically provided by timing unit 26. Dataspace 30 is assumed to be oriented on a plane parallel to the earth's surface.

Referring again to FIG. 4, the sun-angle data have been used to calculate an angle, $\Theta$, between the light rays and the plane of the earth. For each data element 31, it can be determined whether other data elements 31 are interposed between that data element 31 and the sun.

Each data element 31 is assigned an intensity value by first calculating an illumination value, Ilm, that is a product of the illumination value of a data element 31 blocking the sunlight and a liquid water content factor. An example of this calculation may be expressed as follows:

$$Ilm_{n+1} = Ilm_n \left( 1 - \frac{R_{n+1} - R_{min}}{R_{max} - R_{min}} \right)$$

where n+1 identifies the data element 31 whose value is currently being calculated and n identifies a data element 31 immediately interposed between the sun. The $R_{max}$ and $R_{min}$ values are user-defined minimum and maximum values. As an example, they may be specified as follows:

$$R_{min} = \frac{1}{27.4248}$$

$$R_{max} = \frac{10^{65/16}}{27.4248}$$

In this example, $R_{max}$ is a constant based on a radar reflectively value of 65 DB, which is a reasonable maximum water content value for rain. The result of the above calculation is an attenuated illumination value that is based on the extent to which illumination of any data element 31 is attenuated by the water content of data elements 31 between it and the sun.

The Ilm value of each data element 31 is used to calculate its intensity value, Int, as follows:

$$Int = (Ilm * L_B)(1 - L_A) + L_A$$

where $L_B$ and $L_A$ are user-defined light brightness and light ambience values.

In the examples of this description, to facilitate computer calculations, all values are normalized on a scale of 0–1. The intensity value, Int, also will be a value ranging from 0–1.

FIG. 4 shows intensity values of some data elements 31. In general, those data elements 31 that represent a part of the cloud that faces the sun are bright. Data elements 31 that represent a part of the cloud directly opposite the sun are dim. "Bright" and "dim" intensity values are 1 and 0, respectively. All other data elements 31 would have values ranging from 1 to 0.

As a result of the above intensity calculations, if the user's line of sight passes through a cloud, the effect of attenuation will be seen. The amount of attenuation at a given data element 31 is related to the amount of water in the volume of other data elements 31 that a light ray must pass through to arrive at the given data element 31.

Each data element 31 is also assigned a color value and a transparency value. For purposes of this example, a 32-bit value for each data element 31 is assumed, with 8 bits for each RGB (red, green blue) color value and 8 bits for a transparency value, A. Each data element 31 is initially assigned the same base color value and base transparency value. These base values are user-defined and are normalized on a scale of 0–1. Thus, for RGB values that range from 0–255, color values are scaled from 0–1. As an example, where the base color and transparency values are both 0.5, each data element's intensity value is multiplied by 0.5, resulting in color and transparency values ranging from 0–1.

Dithering reduces the occurrence of visual artifacts in an image. A randomized offset is applied to the three-dimensional location of each data element 31.

Weather Simulation Database

The database 15 generated by preprocessor 14, consists of a list of data elements 31, each described by the following parameters:

| wind speed (north, east, down) | (ft/sec) |
|---|---|
| position (north, east, down) | (ft) |
| intensity | (0–1) |
| color | (0–1) |
| transparency | (0–1) |
| pressure | (mB) |
| temperature | (K) |

Pressure and temperature values are optionally used for texture, as explained below in connection with alternative graphics primitive assignments.

Database 15 consists of spatially and temporally linked files that are retrieved and loaded into active memory as needed during image generation.

Subsystem Interface

Subsystem interface 16 receives the aircraft viewpoint and orientation data from flight training system 12. As explained below, this data is used to determine a field of view within dataspace 30.

As indicated in FIG. 1, the simulation subsystem 12 also receives weather data elements 31 via interface 16. When subsystem 12 is a flight training system, this permits the flight simulator 12a to simulate the effects of weather on the aircraft. Subsystem interface 16 continuously interpolates between surrounding data elements 31, using tri-linear interpolation, to determine the atmospheric forces acting on the aircraft during the simulation. For example, because database 15 is a gridded field set of data elements 31, interface 16 may interpolate the eight data elements 31 that comprise a volume surrounding the aircraft. The result can be used to model the wind speed, or some other weather condition, acting on the aircraft. This process occurs continuously as the aircraft moves through the environment represented by the database 15.

Simulator 12a uses the interpolated data from interface 16 to modify its equations of motion, such as are used to determine speed, attitude, and orientation. In this manner, the aircraft's behavior is consistent with what is visually displayed.

Data Handler

Data handler 17 retrieves data from database 15 and viewpoint data from interface 16. In general, data handler 17 performs the operations necessary to generate a prioritized display list of data elements 31 that are in the field of view. This display list is used by image generator 18 to render a display that appears three-dimensional. Data handler 17 is scheduled by timing unit 26 to assure periodic image updates and synchronization with image generator 18.

For display list generation, data handler 17 accesses database 15 and operates on each data element 31 individually. It performs several operations with respect to each data element 31: culling, sorting, graphics primitive assignment, and depth bin assignment.

Culling determines what data elements 31 are in the current field of view of the system 10. Each data element 31 is considered to determine whether it is between a near clipping distance and a far clipping distance. Those that are within this range are further considered to determine whether they are within an up-down and left-right range with respect to a two-dimensional image frame.

Culling operations may be performed with vector projection techniques, using the viewer's current viewpoint vector, VP, as a reference. The culling process is repeated as the user's viewpoint vector changes. If the user is in continuation motion, as is the case when simulator 10 is used for flight simulation, a field of view update occurs every frame. If a data element 31 is not in the field of view no further processing need be performed.

Figure 5:
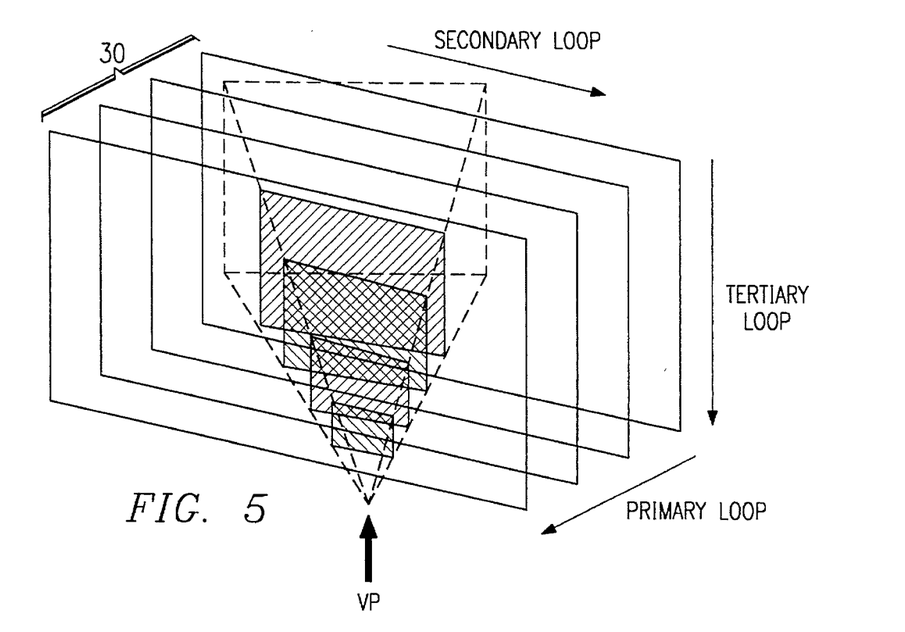
FIG. 5 illustrates the field of view within the dataspace.

FIG. 5 illustrates dataspace 30 as a series of transparent planes. The field of view is illustrated by dashed lines. The intersection of dataspace 30 and the field of view determines which data elements 31 are within the field of view.

For sorting, data handler 17 determines how to traverse the database 15 so that the data elements 31 are accessed in an order that is based on the distance between the data element 31 and the viewpoint. Data elements 31 that are closest to the viewpoint are processed first.

As an example of one method of sorting, data elements 31 that are within the field of view are sorted by means of three nested loops. The primary sort is back-to-front, and the secondary sorts are left-to-right and top-to-bottom. Of course, the order of the primary sort could be front-to-back, with the "beginning" of the list at its end. In either case, the primary sort is by depth. The order of the secondary sorts could be right-to-left or bottom-to-top.

FIG. 5 illustrates a back-left-top priority of sorting. The first sort orders the data in back to front order, a second orders it left to right, and a third orders it top to bottom. Other sorting methods could be used, with the result being a prioritized list of data elements 31, based on their location in the field of view, from which each data element 31 can be accessed according to its depth and from which all data elements 31 of the same depth can be accessed.

Figure 5A:
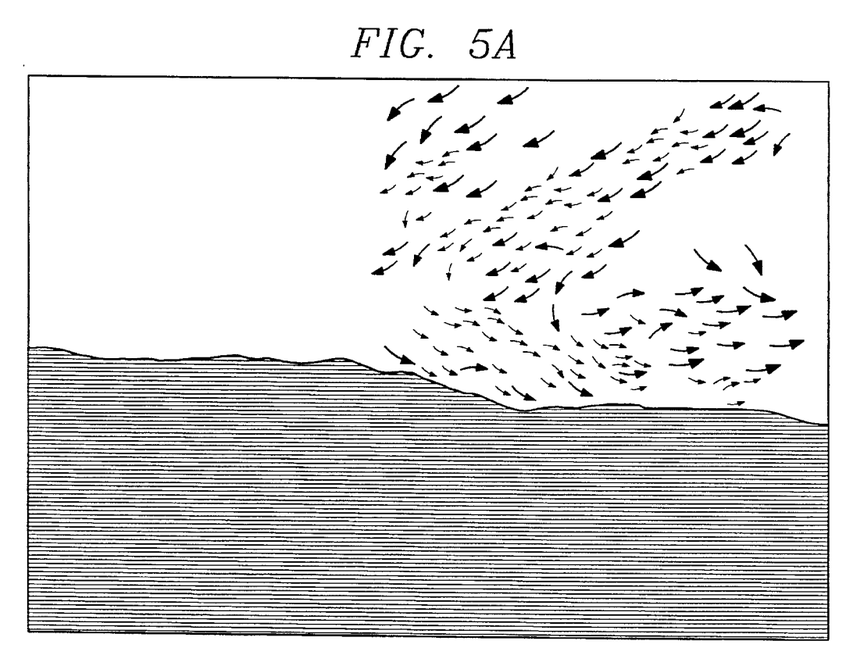
FIG. 5A illustrates the spatial distribution of culled and sorted data elements.

FIG. 5A illustrates the spatial distribution of the culled and sorted data elements 31. Each data element 31 is illustrated in accordance with its wind vector. Only those data elements 31 having a liquid water content above a threshold have been illustrated, and are those data elements 31 that will be represented as clouds. The data elements 31 are drawn in perspective, such that data elements 31 that are closer are larger and more widely spaced.

For visual weather displays, a next step of display list generation is the assignment of a graphics primitive to each data element 31. In a first embodiment, each data element 31 is assigned a polygon-based primitive, known as a "splat". In mathematical terms, a splat is a three-dimensional point spread function about the data element 31. A resulting two-dimensional splat shape is assigned to each data element 31, based on a transformation of that data element's wind vector onto the image plane.

More specifically, the three dimensional point-spread function applied at each data element 31 is implemented as a three-dimensional ellipsoid, such that the longest axis through the ellipsoid is coincident with the direction of the associated wind vector. The splat shape varies from round to elliptical depending on the magnitude of the wind vector. The greater the wind speed, the more elliptical the splat. The length of the longest axis is determined by the magnitude of the wind vector and a scale factor. The lengths of the other two axes are set to some value that is a portion of the length, typically one-half. During image generation, the ellipsoid, oriented along the wind vector, is projected onto the image plane as a two-dimensional ellipse. As the viewpoint vector changes, the ellipse is rotated so that it maintains a desired relationship between its wind vector and the viewpoint vector.

Figure 6A:
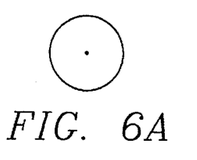
FIGS. 6A–6C illustrate graphics primitives assigned to the data elements.
Figure 6B:
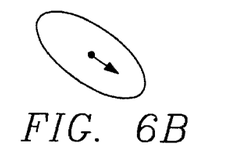
Figure 6C:
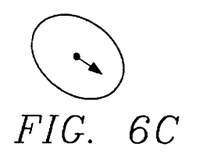

FIGS. 6A–6C illustrate three different splats. The data element 31 whose splat is illustrated in FIG. 6A has a wind vector value of zero, thus its splat is round. The data element 31 whose splat is illustrated in FIG. 6B has a higher wind velocity value than the data element 31 whose splat is illustrated in FIG. 6C. The data elements 31 whose splats are illustrated in FIGS. 6B and 6C have wind vectors in the same direction. It should be understood that FIGS. 6B and 6C are two-dimensional representations of a three dimensional wind vector, thus the wind vector's apparent magnitude is a projection of the true vector into the view area.

After each splat is constructed, it is colored and illuminated according to the parameters of its associated data element 31. The illumination is determined by the transparency value, alpha, calculated during preprocessing. A maximum alpha value, typically the same as the transparency value, is set for the center of the splat shape. The edges of the splat have zero alpha values. Each splat has alpha values that vary across it as a Gaussian function, with the largest value in the center and tapering to a zero value at the edges.

The splat shape along with its varying alpha function is the "footprint" of the particular splat. For perspective imaging, the footprint for the splat of each data element 31 is scaled by its distance from the viewpoint. Thus, splats that are farther away from the field of view origin will appear smaller.

After graphics primitives are assigned, each data element 31 is considered for filling "depth bins", which facilitates the rendering of three-dimensional aspects of the image. For this task, the field of view is first divided into "viewing bins".

Figure 7:
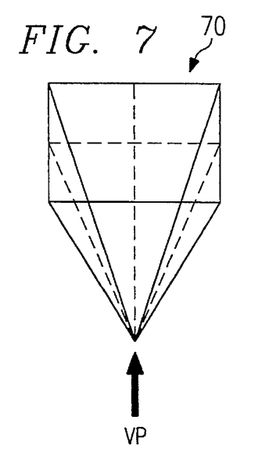
FIG. 7 illustrates how the field of view is divided into viewing bins.

FIG. 7 illustrates how the field of view is divided into "viewing bins", projected to the viewing plane 70. In this example, there are four viewing bins, but any number could be used. In general, the more viewing bins, the more realistically the image can be rendered.

Each viewing bin is "covered" by locating splats, sorted by distance, on the viewing plane and determining whether the area of the viewing bin is covered. Splats whose data elements 31 are closest to the field of view origin have the highest priority. A front-to-back traversal through the database 15 is performed to cover the viewing bins. In other words, the splats of the "frontmost" data elements 31 are used first, with the covering process being repeated for splats of data elements 31 of increasing depth. Each splat is assumed to be scaled for a perspective view as well as to the dimensions of the display, so that a relationship between the dimensions of each splat and the dimensions of the image plane can be determined.

Figure 8:
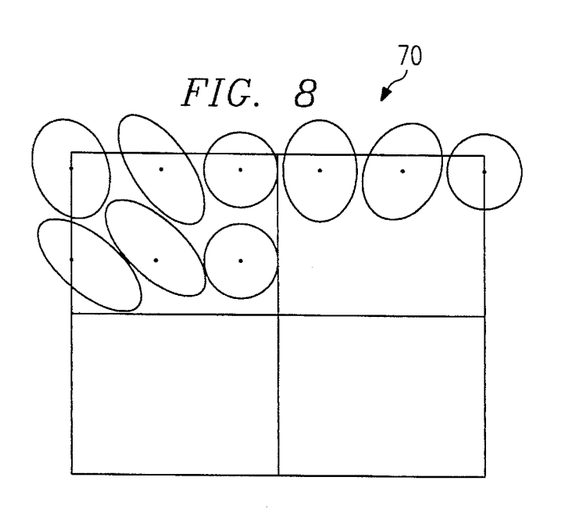
FIG. 8 illustrates how splat-type graphics primitives cover the image plane.

FIG. 8 illustrates the viewing plane 70, with its viewing bins being covered by a first layer of splats. The splats of the frontmost data elements 31 are being used to cover the viewing bins first. Furthermore, in accordance with a front-top-left, prioritized database traversal, the splats of top data elements 31 are used before bottom ones, etc. The viewing bin in the top left corner is considered "covered" because the splat dimensions cover a certain percentage of its area.

Each viewing bin is covered in the same manner. If a first pass of all data elements 31 of a given depth does not cover the image plane 70, another pass is made with data elements 31 farther away. Each set of splats that covers the image plane once is a set of splats for one "depth bin". This covering process is repeated until the viewing bins have been covered a predetermined number of times or until all data elements in database 15 have been used, whichever occurs first. Splats are added to the display list if they fall into a depth bin that is not full. A depth bin is considered full when it has been covered a predetermined number of times.

Image Generator

Image generator 18 generates an image from the display list that is produced by data handler 17. Where subsystem 12 has a display 12b, image generator 18 could be integrated with subsystem 12. As discussed above, the display list is a prioritized list of data elements 31, each associated with a graphics primitive (splat) and a number of data values.

For generating a display, the data in the deepest depth bin are used first, then the remaining data, forward through the depth bins. A process generally known as "rasterization" is performed to draw graphics primitives with pixel values.

An alpha-blending process is used to produce the appearance of three-dimensions. An alpha-blending function combines existing pixel values with new pixel values instead of overwriting them. Existing pixel values are obtained from the background or other previously drawn objects. The current pixel display value is replaced with a weighted average of the new and existing pixel value. Given an alpha value between zero and one, the new pixel value is weighted by alpha and the existing pixel value is weighted by one less alpha. Because of this type of alpha-blending function, a visually realistic weather scene is generated when everything in the scene is drawn in a back-to-front order.

An example of an alpha blending function is:

$$P'_{dest} = min(255, (P_{src} * A_{src}) + (P_{dest} * (1-A_{src})))$$

Each R,G,B and A value for the current pixel, $P'_{dest}$ is calculated from the R,G,B, and A values of the underlying pixel, $P_{dest}$. $P_{src}$ and $A_{src}$ are the new color and alpha values. The "min" function ensures that the calculated value does not exceed the maximum R,G,B or A value, here 255. The result is a 32-bit pixel value, useable by conventional display generation systems.

The two-dimensional splat shape and footprint is approximated with a collection of Gourard-shaped polygons configured in a tri-mesh structure. Conventional display generation systems draw these polygons efficiently. These polygons can be used to build the number of angular subdivisions, the number of radial subdivisions, and a color and transparency value at each radial distance. The Gourard shading algorithm generates the approximated footprint by resolving the linear interpolation of the alpha-blend value across the splat shape.

Other Graphics Primitives

As an alternative to assigning splat graphics primitives, data handler 17 assigns other types of primitives to each data element 31. One alternative primitive is referred to as a "billboard". Each billboard is a rectangular shape, which like a splat, approximates an ellipsoid. Like a splat, its shape and orientation are determined by the magnitude of the wind vector.

Figure 9:
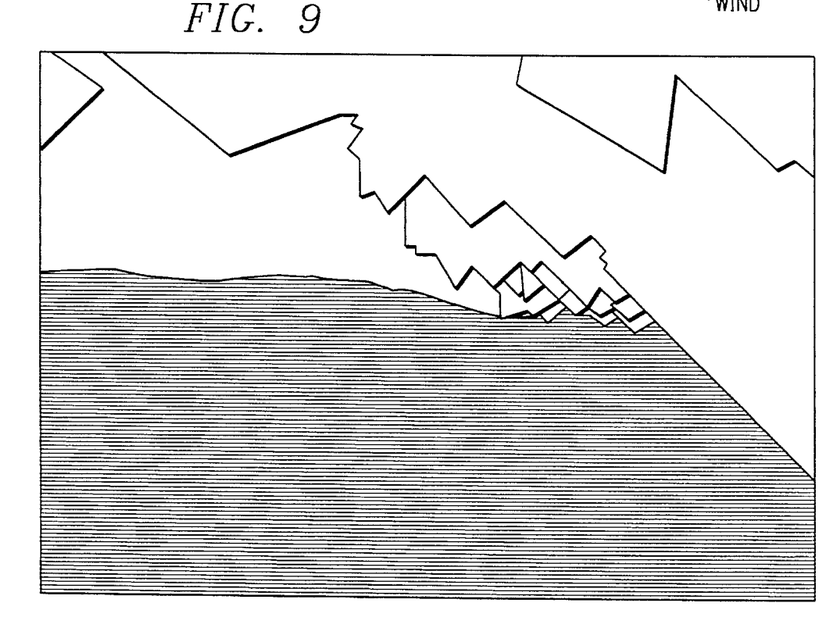
FIG. 9 illustrates how billboard-type graphics primitives cover the image plane.
Figure 10:
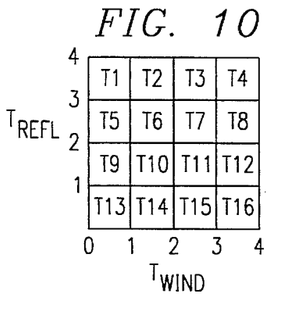
FIG. 10 illustrates how a texture library may be used to assign textures to graphics primitives.

FIG. 9 illustrates how billboards are used to cover the image plane. Each billboard is aligned with the wind vector of the associated data element 31. In a manner similar to that used for splats, billboards associated with data elements 31 in front to back order, beginning at one end of the prioritized display list. The billboards are used to cover the image plane in one or more depth bins. Once billboards are assigned, image generation occurs in back to front order.

Billboards are used in conjunction with a texture library. A specific texture is assigned to each billboard, as determined by a meteorologically based look-up table or other reference. Textures are determined by parameters obtained from database 11.

FIG. 9 illustrates a two-dimensional texture look-up table having 16 textures, which are selected in accordance with wind and liquid water content parameters. For each data element 31, a wind texture value, $T_{wind}$, is determined as follows:

$$T_{wind} = (W - W_{min})(K_A) + K_B$$

where W is the magnitude of the wind vector of that data element 31 and $W_{min}$ is a user-defined wind threshold. $K_A$ and $K_B$ are user-defined constants, which limit the texture values to a predetermined range, here 1–4. A reflectivity texture value, $T_{Refl}$, is determined as follows:

$$T_{Refl} = (R - R_{min})(C_A) + C_B$$

where R is the reflectivity value of the data element 31 and $R_{min}$ is a user-defined threshold. $C_A$ and $C_B$ are user-defined constants, which limit the texture values to a range of 1–4.

For a data element 31 whose texture values were $T_{wind} = 2.5$ and $T_{refl} = 3.5$, texture T3 would be assigned to the billboard for that data element 31. The range of values for each texture type corresponds to the number of available textures, here 4×4. High wind and reflectivity values are associated with rain-type textures, such as T4. Low values are associated with clearer textures, such as T13.

Other textures could be derived from other parameters, such as pressure and temperature. As an example, temperature and pressure could be considered ambient, such that different look-up tables could be used for different pressure and temperature ranges.

Texture levels of detail are maintained in the library to support viewing resolution as a function of the location of weather data elements 31. Data elements 31 closer to the viewpoint are mapped with higher detail textures than those that are far away. Thus, the look-up table could be three-dimensional, with the third dimension being a range value.

Other than their rectangular shape and texture, billboards are handled the same as described above for splats. Textures have alpha values that are blended as described above. Like splats, billboards are rotated so that they are always normal to the viewpoint vector, VP.

Subsystems Other than Flight Simulation

As stated above, subsystems 12 other than a "through-the-window" flight training system could be used with weather simulator 10. For example, subsystem 12 could be a flight training system 12*b* with a display 12*b* of cockpit radar instrumentation. Or, subsystem 12 could be a simulation of remotely controlled machinery being observed in various weather environments.

The subsystem interface 16 provides appropriate field of view data for use by data handler 17 in a manner similar to that used for aircraft field of view data. For example, for a radar display, subsystem 12 would provide field of view data determined by the range and azimuth of the radar.

Typically, subsystem 12 provides some sort of visual display that is affected by weather conditions. In the radar example, the weather conditions affect the radar color map. In the remotely controlled machinery example, conditions such as rain can be illustrated. In any event, data handler 17 associates some sort of graphical data with the prioritized data elements, which it provides to image generator 18. For radar displays, the graphical data could be simply a color value.

As stated above, simulation interface 16 provides data elements 31 to the subsystem 12 for use in modifying equations of motion. In the radar example, this permits subsystem 12 to simulate the effects of weather on the motion of the aircraft, in a manner similar to the "through the window" simulation described above. In the remotely controlled machinery example, the effects of weather on the operation of the machine can be observed. A key feature of the invention is the transformation of real world data, to generate a prioritized display list.

Data handler 17 performs the same culling and sorting functions to generate a prioritized display list.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of using a computer to provide display data representing weather conditions based on real-world weather data, comprising the steps of:

accessing a real-world weather database to obtain a three-dimensional set of data elements, each data element having at least a location value and a liquid water content value;

receiving illumination angle data from which the angle of an illumination source with respect to the earth's surface can be calculated;

calculating a transparency value for each of said data elements, using said liquid water content value and said illumination data;

culling said data elements to determine which are within a field-of-view, to obtain a set of field-of-view data elements;

sorting said field-of-view data elements to form a list of data elements in depth order;

assigning a graphics primitive to each of said field-of-view data elements;

covering an image plane with the graphic primitives associated with the frontmost of said field-of-view data elements, such ath a certain percentage of said image plane is covered;

repeating said covering step, using said field-of-view data elements in front to back order, until the image plane has been covered a predetermined number of times or until a predetermined number of said field-of-view data elements have been used; and assigning said field-of-view data elements to one or more depth bins on the basis of the results of said covering step, so as to generate a prioritized display list.

2. The method of claim 1, further comprising the step of determining whether a value of said data elements exceeds a threshold, and wherein said calculating step and all subsequent steps are performed with respect to those data elements for which said threshold is exceeded.

3. The method of claim 1, further comprising the steps of transforming the location values associated with said data elements to a coordinate system different from that of said real-world weather database.

4. The method of claim 1, where said culling step is performed by obtaining said field-of-view from an external data source.

5. The method of claim 1, wherein said illumination source is the sun and said illumination angle data is sun angle data.

6. The method of claim 1, wherein said calculating step is performed by calculating an intensity value for each data element based on whether its illumination is attenuated by other data elements, and using said intensity value to determine said transparency value.

7. The method of claim 6, wherein said intensity value of each data element is derived from an attenuated illumination value that is based on the illumination value of a data element interposed between said each data element and said illumination source.

8. The method of claim 6, wherein said intensity value of each data element is calculated as a function of an attenuated illumination value and a brightness value.

9. The method of claim 1, wherein said calculating step is performed so as to calculate a color value as well as said tarnsparency value, using said liquid water content value and said illumination angle data.

10. The method of calim 1, wherein said field-of-view is repeatedly updated and wherein said culling step and all subsequent steps are repeated in accordance with field-of-view updates.

11. The method of claim 1, wherein each said graphics primitive has one or more pixels.

12. The method of claim 1, wherein each said data element also has a wind vector value and wherein each said graphics primitive is an ellipsoid, having an elongation determined by the wind vector value of a data element associated with that graphics primitive.

13. The method of claim 1, wherein each said graphics primitive is an ellipsoid with an illumination value and a transparency value derived from the data element associated with that graphics primitive.

14. The method of claim 1, wherein each said graphics primitive is approximated as rectangles, having an assigned texture derived from a data element associated with that graphics primitive.

15. The method of claim 1, wherein said steps of culling, sorting, assigning, covering, and prioritizing are performed sufficiently fast so as to permit a real-time display of said display data.

16. The method of claim 1, wherein said field-of-view is represented by a field-of-view vecto, and further comprising the step of rotating the plane of each said graphics primitive such that it is normal to a field-of-view vector.

17. The method of claim 1, further comprising the step of delivering said display list to a simulation system that displays the weather in a viewing field of regard.

18. The method of claim 1, further comprising the step of rasterizing said display list after said prioritizing step.

19. The method of claim 18, wherein said rasterizing step is performed by assigning pixel values to the graphics primitives in the deepest of said depth bins using the transparency values assigned to the data element associated with each graphics primitive, and repeating said assigning step to obtain pixel values for each of said depth bins, in back to front order, such that for each pixel, the transparency value of an underlying pixel is used to derive a pixel value.

20. A weather simulator for generating display data representing simulated weather conditions based on real-world weather data, comprising:

a preprocessor for (1) accessing a real-world database to obtain a three-dimensional set of data elements, each data element having at least a location value and a liquid water content value, and (2) using said liquid water content value and illumination angle data to calculate a transparency value for each of said data elements;

a memory for storing said data elements; and a data handler for (1) culling said data elements to determine which are in a field-of-view, to obtain a set of field-of-view data elements, (2) sorting said field-of-view data elements to form a list of data elements in depth order, (3) assigning a graphics primitive to each of said field-of-view data elements, (4) covering an image plane with the graphics primitives associated with the frontmost of said field-of-view data elements, such that a certain percentage of said image plane is covered; (5) repeating said covering step, using said field-of-view data elements in front to back order, until the image plane has been covered a predetermined number of times or until a predetermined number of said field-of-view data elements have been used; and (6) assigning said field-of-view data elements to one or more depth bins on the basis of the results of said covering step, so as to generate a prioritized display list.

21. The simulator of claim 20, further comprising a subsystem interface for rerceiving said illumination angle data and delivering said data to said data handler.

22. The simulator of claim 21, wherein said subsystem interface receives said illumination angle data via input by a user.

23. The simulator of claim 21, wherein said subsystem has a timer for generating said illumination data is time-of-day data.

24. The simulator of claim 20, further comprising a subsystem interface for receiving threshold data specifying a threshold of a data element value, and wherein said data handler operates only on those data elements for which said threshold is exceeded.

25. The simulator of claim 20, further comprising a subsystem interface for receiving field-of-view data from a simulator to determine said field-of-view, and for deilvering said display data to said simulator.

26. The simulator of claim 21, further comprising an image generator for rasterizing said graphics primitives by (1) assigning pixel values to the graphics primitives in the deepest of said depth bins, using the transparency values assigned to the data element associated with each graphics primitive; and (2) repeating said assigning step to obtain pixel values for each of said depth bins, in back to front order, such that for each pixel, the transparency value of an underlying pixel is used to derive a pixel value.

27. The simulator or claim 20, wherein said preprocessor further transforms said location values to a different coordinate system.

28. The simulator of claim 20, wherein each said data element also has a wind vector value and wherein said graphics primitives are ellipsoids, each having an elongation determined by the wind vector value of the associated data element.

29. The simulator of claim 20, wherein said simulator operates sufficiently fast so as to provide display data for real time.

* * * * *